(12) United States Patent
Ikeyama et al.

(10) Patent No.: US 8,141,678 B2
(45) Date of Patent: Mar. 27, 2012

(54) SOUND-PERMEABLE FILM, ELECTRONIC COMPONENT WITH SOUND-PERMEABLE FILM, AND METHOD OF PRODUCING CIRCUIT BOARD HAVING ELECTRONIC COMPONENT MOUNTED THEREON

(75) Inventors: Yoshiki Ikeyama, Osaka (JP); Yuri Horie, Osaka (JP); Kouji Furuuchi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 1049 days.

(21) Appl. No.: 11/991,977

(22) PCT Filed: Sep. 11, 2006

(86) PCT No.: PCT/JP2006/317983
§ 371 (c)(1),
(2), (4) Date: Mar. 13, 2008

(87) PCT Pub. No.: WO2007/032312
PCT Pub. Date: Mar. 22, 2007

(65) Prior Publication Data
US 2009/0268928 A1   Oct. 29, 2009

(30) Foreign Application Priority Data
Sep. 14, 2005   (JP) ................. 2005-267647

(51) Int. Cl.
*G10K 11/00* (2006.01)
(52) U.S. Cl. ........... 181/175; 181/167; 29/594; 381/150

(58) Field of Classification Search .......... 181/167, 181/175; 29/594; 381/150; 156/281
See application file for complete search history.

(56) References Cited

U.S. PATENT DOCUMENTS

| | | | | |
|---|---|---|---|---|
| 5,828,012 A | * | 10/1998 | Repolle et al. | 181/175 |
| 6,512,834 B1 | * | 1/2003 | Banter et al. | 381/386 |
| 6,994,621 B2 | * | 2/2006 | Mashiko et al. | 454/270 |
| 7,561,704 B2 | * | 7/2009 | Chan | 381/150 |
| 2005/0018864 A1 | | 1/2005 | Minervini | |
| 2009/0268928 A1 | * | 10/2009 | Ikeyama et al. | 381/150 |
| 2010/0046771 A1 | * | 2/2010 | Gregg et al. | 381/98 |
| 2010/0166230 A1 | * | 7/2010 | Tseng et al. | 381/150 |
| 2011/0143114 A1 | * | 6/2011 | Horie et al. | 428/219 |

FOREIGN PATENT DOCUMENTS

| | | |
|---|---|---|
| JP | 9-008446 A | 1/1997 |
| JP | 9-046403 A | 2/1997 |
| JP | 10-176150 A | 6/1998 |
| JP | 2002-502561 A | 1/2003 |
| JP | 2003-503991 A | 1/2003 |
| JP | 2003-053872 A | 2/2003 |

* cited by examiner

*Primary Examiner* — Forrest M Phillips
(74) *Attorney, Agent, or Firm* — Hamre, Schumann, Mueller & Larson, P.C.

(57) ABSTRACT

A sound-permeable film (11) includes: a porous membrane (13) that contains polytetrafluoroethylene as its main component, allows sound to pass therethrough, and prevents an foreign object such as a water drop from passing therethrough; and a heat-resistant double-sided adhesive sheet (15) that is disposed on a part of at least one of main surfaces of the porous membrane (13).

8 Claims, 3 Drawing Sheets

SOUND-PERMEABLE FILM, ELECTRONIC COMPONENT WITH SOUND-PERMEABLE FILM, AND METHOD OF PRODUCING CIRCUIT BOARD HAVING ELECTRONIC COMPONENT MOUNTED THEREON

TECHNICAL FIELD

The present invention relates to a sound-permeable film used for information and telecommunications equipment such as a mobile phone and the like. The present invention also relates to an electronic component with the sound-permeable film. The present invention further relates to a method of producing a circuit board on which an electronic component with a sound-permeable film is mounted.

BACKGROUND ART

A through-hole as a mouthpiece is provided on the body of a mobile phone that is a typical information and telecommunications equipment. In order to prevent foreign objects such as dust, water drops and the like from entering this through-hole and thus causing malfunctions, a film called a sound-permeable film is disposed inside the body (JP 2003-53872 A).

A sound-permeable film is generally composed of a non-woven fabric or a resin porous membrane, which prevents foreign objects such as water drops and the like from entering the body, while ensuring the excellent sound permeability between the inside and outside of the body.

DISCLOSURE OF INVENTION

As a method for applying the above-mentioned sound-permeable film to, for example, a mobile phone, it is common to attach the film one by one to the body of a mobile phone from inside thereof. Meanwhile, there is an attempt to attach a sound-permeable film to an electronic component itself to be mounted on a circuit board. This attempt, however, has a problem concerning the structural change of the electronic component and endurance of the sound-permeable film.

An object of the present invention is to provide a sound-permeable film suitable for a component to be mounted on a circuit board. Another object is to provide an electronic component with the sound-permeable film. Still another object is to provide a method of producing a circuit board on which an electronic component with a sound-permeable film is mounted.

More specifically, the present invention provides a sound-permeable film including: a porous membrane that contains polytetrafluoroethylene as its main component, allows sound to pass therethrough, and prevents a foreign object such as a water drop from passing therethrough; and a heat-resistant double-sided adhesive sheet that is disposed on a part of at least one of main surfaces of the porous membrane in order to fix the porous membrane to another component. "Main component" denotes a component whose content is the largest by mass %. For example, a porous membrane that is made of a material containing polytetrafluoroethylene with an accessory component such as a silica filler and the like mixed therein is classified as the porous membrane in the present invention.

A porous membrane made of polytetrafluoroethylene is a material that can attain, at a higher level, waterproofness and dustproofness as well as sound permeability, which are usually in a trade-off relationship, and is suitable as a material for a sound-permeable film. In addition, polytetrafluoroethylene has excellent heat resistant properties (its melting point is about 327° C.). The sound-permeable film of the present invention is a porous membrane that contains polytetrafluoroethylene as its main component and has a heat-resistant double-sided adhesive sheet attached, thereon. Therefore, this sound-permeable film allows it to carry out a special process sequence in which, after the sound-permeable film is attached to another component such as an electronic component or the like having a sound input/output function, reflow soldering is carried out to mount the other component on a circuit board. In other words, the sound-permeable film of the present invention can be suitable for a component to be soldered to a circuit board.

It is also possible to place a heat-resistant double-sided adhesive sheet on one of the main surfaces (a first main surface) of a porous membrane, and place a support having heat resistance and sound permeability on the other main surface (a second main surface). This arrangement improves the handling of the sound-permeable film, thus making it easier to attach this film to another component. It should be noted that the "main surface" denotes a surface having the largest area.

As the above-mentioned double-sided adhesive sheet, a resin sheet including a base layer and two adhesive layers that sandwich the base layer therebetween can be adopted. This double-sided adhesive sheet has a wide choice of materials and thus can achieve a good balance between heat resistance and adhesive strength.

It is desirable that the above-mentioned base layer have a heat shrinkage ratio of less than 4% after being left for 10 minutes at 200° C. If the base layer is a double-sided adhesive sheet having such heat resistance, it is possible to maintain the adhesive strength required to fix the porous membrane to the electronic component over a period before and after the aforementioned reflow soldering process.

Preferably, the base layer contains a polyimide resin or an aramid resin as its main component. Since these resins are particularly excellent in heat resistance among others, they are suitable for the base layer of the heat-resistant double-sided adhesive sheet.

Another aspect of the present invention provides an electronic component with a sound-permeable film, including: an electronic component including a sound receiving portion that converts sound into an electrical signal or a sound emitting portion that converts an electrical signal into sound; and a sound-permeable film that is attached to the electronic component, allows sound to be transmitted from outside to the sound receiving portion or sound emitted from the sound emitting portion to be transmitted outside, and prevents an foreign object such as a water drop from reaching the sound receiving portion or the sound emitting portion from outside. In this electronic component with the sound-permeable film, the electronic component is a component that is mounted on a circuit board to be operated, and the sound-permeable film includes: a porous membrane that contains polytetrafluoroethylene as its main component; and a heat-resistant double-sided adhesive sheet that is located between the porous membrane and the electronic component so as to fix the porous membrane and the electronic component to each other.

For example, in the case where the sound-permeable film is made of a resin having insufficient heat resistance, it is required to follow the process sequence in which the electronic component is mounted on the circuit board before the sound-permeable film is attached to the electronic component. According to the electronic component with the sound-permeable film of the present invention, however, since the sound-permeable film has sufficient heat resistance, this electronic component with the sound-permeable film can be subjected to reflow soldering.

Furthermore, the present invention provides a method of producing a circuit board on which an electronic component including a sound receiving portion that converts sound into an electrical signal or a sound emitting portion that converts an electrical signal into sound is mounted. This method includes: a first step of fixing or temporarily fixing a porous membrane that contains polytetrafluoroethylene as its main component to the electronic component using a heat-resistant double-sided adhesive sheet so that sound is allowed to be transmitted from outside to the sound receiving portion or sound emitted from the sound emitting portion is allowed to be transmitted outside and that an foreign object such as a water drop is prevented from reaching the sound receiving portion or the sound emitting portion from outside; and a second step of positioning the electronic component to which the porous membrane is fixed or temporarily fixed and the circuit board relatively to each other, and putting the positioned circuit board and electronic component into a reflow furnace so as to connect them by soldering, and the first step and the second step are performed in this order.

In the above-mentioned production method of the present invention, the porous membrane that is fixed or temporarily fixed to the electronic component is made of polytetrafluoroethylene having excellent heat resistance. As for the double-sided adhesive sheet, a heat-resistant sheet also is used. Therefore, the porous membrane as well as the electronic component can be subjected to reflow soldering (the second step). Some types of heat-resistant double-sided adhesive sheets need to be heated to make their adhesive strength effective. In such a case, according to the method of the present invention, the heating step required to fix the porous membrane and the electronic component also can be performed in the reflow soldering process. Thus, it is expected to reduce the number of steps substantially.

Preferably, the heat-resistant double-sided adhesive sheet includes: a base layer that contains a first resin as its main component; and adhesive layers that contain a second resin as its main component having a different composition from that of the first resin and are located on the top and the bottom of the base layer. This type of double-sided adhesive sheet has a wide choice of materials and thus can achieve a good balance between heat resistance and adhesive strength.

It is desirable to select, as a solder for connecting the circuit board and the electronic component, a solder having a lower melting point than a maximum adhesive temperature up to which the adhesive strength of the heat-resistant double-sided adhesive sheet can be maintained, and to control the temperature in the reflow furnace within a range between the maximum adhesive temperature and the melting point of the solder. By doing so, it is free not only from a substantial loss of adhesive effect (bonding effect) of the double-sided adhesive sheet during the reflow soldering process, but also from displacement between the porous membrane and the electronic component, resulting in secure bonding therebetween.

BEST MODE FOR CARRYING OUT THE INVENTION

Figure 1:
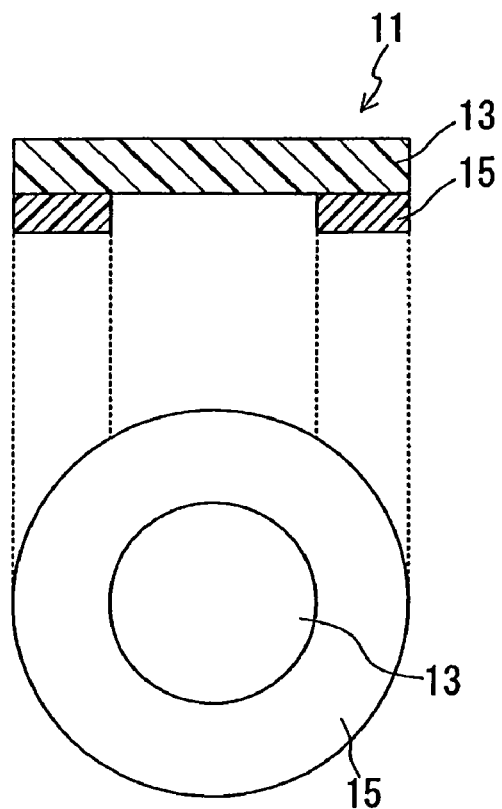
FIG. 1 shows sectional and plan views of a sound-permeable film of the present invention.

Hereinafter an embodiment of the present invention will be described with reference to the accompanying drawings. FIG. 1 is sectional and plan views showing a sound-permeable film of the present invention. As shown in FIG. 1, a sound-permeable film 11 of the present invention includes a porous membrane 13 and a double-sided adhesive sheet 15. The porous membrane 13 has an approximately circular shape in plan view. The ring-shaped double-sided adhesive sheet 15 is placed on the peripheral portion of one of the surfaces (a first main surface) of the circular porous membrane 13. The excellent sound permeability of the porous membrane 13 can be maintained by limiting the area for placing the double-sided adhesive sheet 15 to a part of the surface so that both sides of the porous membrane 13 are sufficiently exposed.

The porous membrane 13 is a sheet with many micropores formed thereon in a dispersed manner, and has both high sound permeability as well as air permeability. As a material for the porous membrane 13, polytetrafluoroethylene (PTFE) can be used in view of its heat resistance, as described later. The porous membrane 13 can be obtained by stretching a PTFE membrane uniaxially or biaxially. The porous membrane 13 may be made from a pure PTFE membrane, or it may be made from a PTFE membrane with an appropriate amount of a filler such as silica or the like mixed therein for improving its mechanical properties and heat resistance. Although the thickness of the porous membrane 13 is not particularly limited, it can be in a range between, for example, 2 μm and 1000 μm, inclusive, in view of the water repellency and air permeability. It is desirable that the diameter of each pore of the porous membrane 13 be in a range between 0.1 μm and 1000 μm, inclusive. It should be noted that water repellent finishing may be performed, using a fluoropolymer or the like, on the surface of the porous membrane 13 located on the opposite side to the surface where the double-sided adhesive sheet 15 is placed, to enhance its water repellency.

Figure 3:
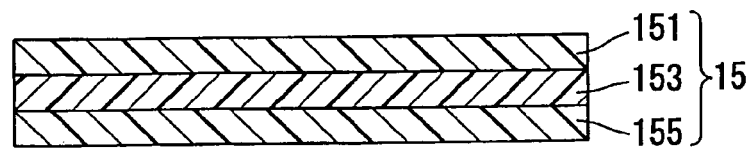
FIG. 3 is a sectional view of a double-sided adhesive sheet.

The double-sided adhesive sheet 15 has adhesive strength on both side thereof, and serves to fix the porous membrane 13 to another component. Although a separator (not shown in the figure) is provided on the side opposite to the surface of the double-sided adhesive sheet 15 which is in contact with the porous membrane 13, it is removed when the film 11 is used. As shown in FIG. 3, this double-sided adhesive sheet 15 may have a three-layer structure (multilayer structure) consisting of a base layer 153, and a pair of adhesive layers 151 and 155 sandwiching the base layer 153 therebetween. As with the porous membrane 13, the double-sided adhesive sheet 15 also is required to have heat resistance. The multilayer structure as shown in FIG. 3 offers a wider choice of materials, thereby making it easier to achieve a balance between adhesive strength and heat resistance.

Specifically, it is desirable that the base layer 153 be composed of a resin with a heat shrinkage ratio of less than 4% after being left for 10 minutes at 200° C. If the heat shrinkage ratio of the base layer 153 is small enough, a problem of deterioration of adhesive strength caused by shrinkage of the base layer 153 is unlikely to become apparent even if the double-sided adhesive sheet 15 is subjected to thermal history, thereby allowing it to maintain sufficient adhesive strength. As a resin having the aforementioned properties, a polyimide resin or an aramid resin can be given as an example.

Meanwhile, it is desirable that the adhesive layers 151 and 155 be composed of a silicone or acrylic adhesive. Since these adhesives have sufficient heat resistance, the adhesive strength of the double-sided adhesive sheet 15 is maintained even if the double-sided adhesive sheet 15 is subjected to thermal history during reflow soldering to be described later. As a method for forming the adhesive layers 151 and 155 on the base layer 153, it is possible to propose a method in which a solution obtained by dissolving a silicone or acrylic adhesive into a suitable organic solvent such as toluene or the like is applied to the base layer 153, which then is dried. The base layer 153 can be omitted in some cases. Specifically, a baseless double-sided adhesive sheet made of a single adhesive layer can be used instead of the double-sided adhesive sheet 15 as described above.

It should be noted that the shrinkage ratio of a resin can be measured in the following manner. First, a sample piece of appropriate length is obtained from a strip-shaped resin film having a width of 10 mm. Next, the sample piece is set on a sampling stage to be close contact with the stage in such a manner that the center part of the sample piece corresponds with the measuring direction (along the length or across the width). The sample piece is marked by lines at 200 mm intervals and cut by laser at 10 mm intervals along the measuring direction. The length of the sample piece is adjusted to be in a range between 240 and 260 mm including the fixing margins at both ends of the sample piece (20 to 30 mm each). This sample piece is clipped to a jig and put into a heat treatment furnace. The atmosphere temperature in the heat treatment furnace is raised to 200° C. and kept for 10 minutes. After the sample piece is taken out from the heat treatment furnace and cooled, the variations in the length between respective marker lines are measured on the sampling stage to estimate the shrinkage ratio. The sampling stage is, for example, a piece of graph paper covered with a vinyl chloride sheet.

Figure 2:
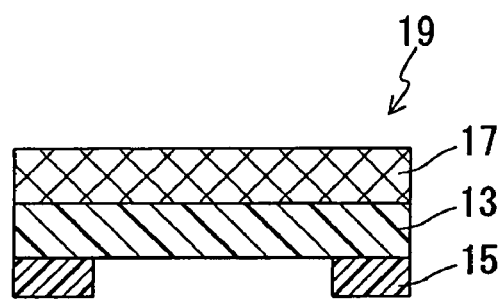
FIG. 2 is a sectional view of a sound-permeable film further equipped with a support.

FIG. 2 is a sectional view of a sound-permeable film with a support. A sound-permeable film 19 includes the porous membrane 13, the double-sided adhesive sheet 15 and a support 17. The porous membrane 13 and the double-sided adhesive sheet 15 are the same as in FIG. 1. The support 17 is disposed on the main surface (a second main surface) of the porous membrane 13 located on the opposite side to the surface where the double-sided adhesive sheet 15 is placed. The porous membrane 13 and the support 17 are fixed to each other by welding or an adhesive. According to the support 17 as described above, the effects of higher workability for obtaining a sound-permeable film 19 of a predetermined shape as well as improved handling of the sound-permeable film 19 can be expected.

As a material of the support 17, materials that do not significantly reduce the sound permeability of the porous membrane 13, for example, net, mesh, nonwoven fabric or woven fabric, can be used. In addition, the support 17 is required to have a heat resistance as high as that of the porous membrane 13 and the double-sided adhesive sheet 15. Therefore, aramid paper, mesh made of a polyarylate resin (molded mesh), fluororesin nonwoven fabric or metal mesh, for example, suitably can be used as a material of the support 17. These materials are strong enough to withstand the heating temperature in the reflow soldering process to be described later.

Figure 4:
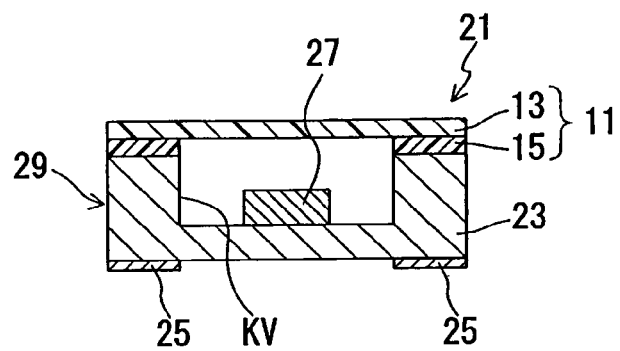
FIG. 4 is a sectional view of an electronic component with a sound-permeable film.

FIG. 4 is a sectional view of an electronic component with the sound-permeable film in FIG. 1. An electronic component 29 includes a component body 27, a package 23 having a cavity KV in which the component body 27 is housed, and terminals 25, 25 to be connected to a circuit board. The component body 27 has a function of a microphone as a sound receiving portion for converting sound into an electrical signal or a function of a speaker as a sound emitting portion for converting an electrical signal into sound. An electronic component with the sound-permeable film 21 is obtained by bonding the sound-permeable film 15 as illustrated in FIG. 1 to the opening of the package 23 so as to seal the cavity KV of the package 23 which houses the component body 27. The sound-permeable film with the support 19 in FIG. 2, instead of the sound-permeable film 11 in FIG. 1, also may be attached to the package 23.

Figure 5:
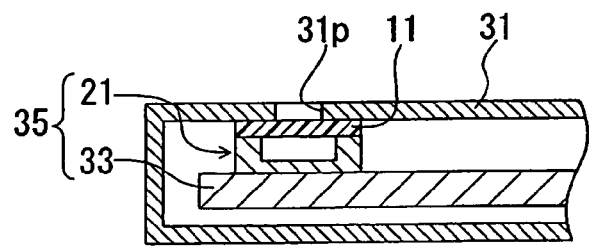
FIG. 5 is a sectional view showing a casing which houses a circuit board having an electronic component mounted thereon.

FIG. 5 is a sectional view showing a body (a casing) of information and telecommunications equipment (a mobile phone, for instance) which houses a circuit board having an electronic component mounted thereon. A circuit board having an electronic component mounted thereon 35 is obtained by mounting the electronic component with the sound-permeable film 21 illustrated in FIG. 4 on the circuit board 33. The circuit board 33 serves to send and receive signals between the electronic component with the sound-permeable film 21 and another electronic component (not shown in the figure) such as a CPU, and to supply power to these electronic components. The electronic component with the sound-permeable film 21 can be mounted on the circuit board 33 (surface mounting, to be more specific) by soldering. A body 31 is, for example, made of a resin such as polypropylene having a good moldability. A through-hole 31p on the body 31 is, for example, a mouthpiece or an ear piece of a mobile phone.

The electronic component with the sound-permeable film 21 is mounted on the circuit board 33 so as to face the through-hole 31p. The sound-permeable film 11 is attached in contact with the through-hole 31p from inside the body 31. As a result, this sound-permeable film 11 allows sound emitted from the component body 27 (see FIG. 4) as a sound emitting portion to be transmitted outside the body 31, allows sound to be transmitted from outside the body 31 to the component body 27 as a sound receiving portion, and prevents foreign objects such as dust, water drops and the like from entering the body 31 through the through-hole 31p. It should be noted that in order to further improve its waterproofness and dust-proofness, another sound-permeable film, in addition to the sound-permeable film 11 provided on the electronic component with the sound-permeable film 21, may be disposed inside the body 31.

Figure 6:
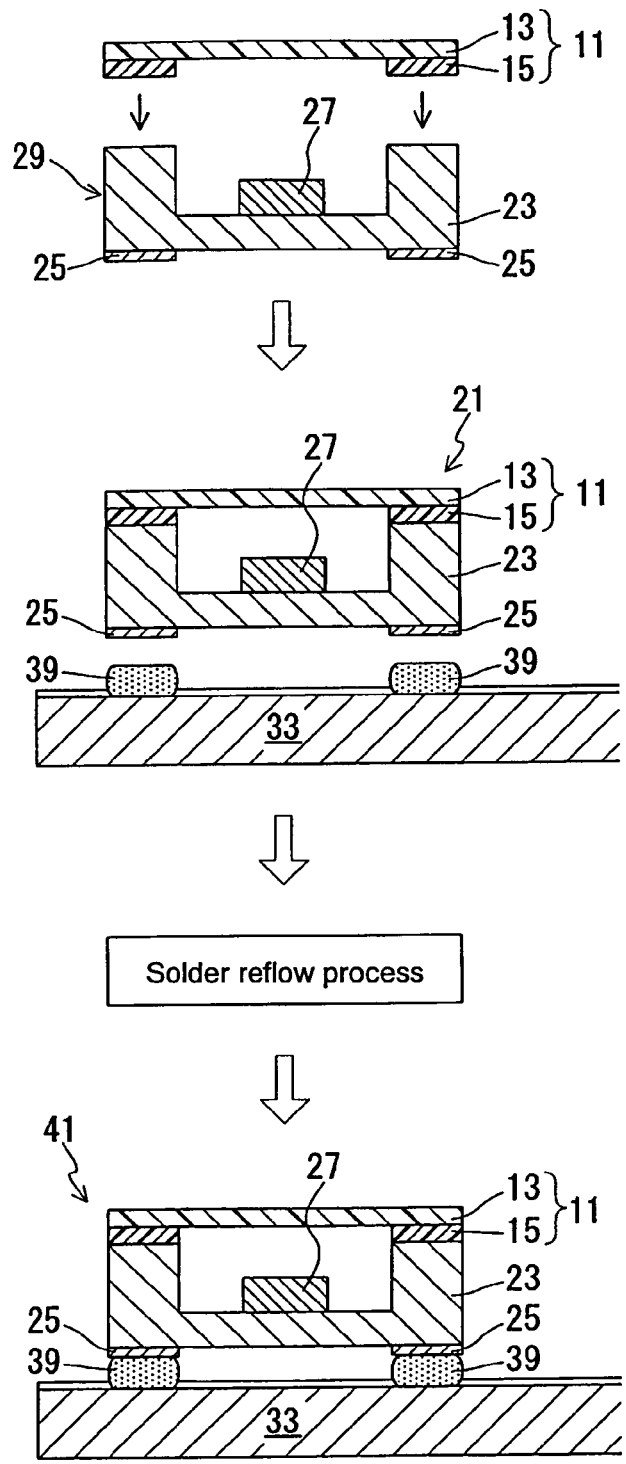
FIG. 6 is a diagram illustrating a process of producing the circuit board having the electronic component mounted thereon in FIG. 5.

Next, a procedure of producing the circuit board having the electronic component mounted thereon 35 as illustrated in FIG. 5 will be described. First, the double-sided adhesive sheet 15 is prepared by applying an adhesive such as a silicone adhesive or the like on both surfaces of a resin film such as a polyimide film or the like having heat resistance, which is then dried. The double-sided adhesive sheet 15 and the PTFE porous membrane 13 are cut into pieces of a predetermined shape and the double-sided adhesive sheet 15 is attached firmly to one of the surfaces of the PTFE porous membrane 13 so as to obtain the sound-permeable film 11. The sound-permeable film 11 obtained as above is attached firmly to the separately prepared electronic component 29, as shown in FIG. 6 (the first step). Heat treatment may be carried out, if necessary, in order to activate the adhesive strength of the double-sided adhesive sheet 15.

Next, the electronic component with the sound-permeable film 21 and the circuit board 33 are positioned relative to each other. Reflow soldering (the second step) is carried out to connect the terminals (not shown in the figure) on the circuit board 33 with the terminals 25, 25 of the electronic component with the sound-permeable film 21 by solders 39, 39 while maintaining the relative position therebetween. It is preferable to use a solder having a melting point as low as possible as the solder 39 for mounting the electronic component with the sound-permeable film 21 on the circuit board 33. As such a solder, an Sn—Pb eutectic solder (having a melting point of about 183° C.) is commonly used. As for lead-free solders, Sn—Ag-based and Sn—Ag—Cu-based solders (both having a melting point of about 220° C.) can be given, for example.

More specifically, it is preferable to select, as the solder 39 used for connecting the circuit board 33 and the electronic component with the sound-permeable film 21 in the reflow soldering process, a solder having a lower melting point than the maximum adhesive temperature (280° C., for instance) required for maintaining the adhesive strength of the double-sided adhesive sheet 15. For example, not only an Sn—Pb eutectic solder is used, but also the atmosphere temperature in the reflow furnace is controlled so that it is maintained at a temperature between the above maximum adhesive temperature and the melting point of the Sn—Pb eutectic solder. By doing so, it is possible to mount the electronic component with the sound-permeable film 21 on the circuit board 33 without causing a defect such as peeling of the sound-permeable film 11.

It should be noted that it is also possible to temporarily fix the sound-permeable film 11 to the electronic component 29 in the step (the first step) previous to reflow soldering so that the bonding between them increases during the reflow soldering. By doing so, the heating treatment for fixing the sound-permeable film 11 to the electronic component 29 also can be performed in the reflow soldering process. The sound-permeable film 11 and the electronic component 29 also may be fixed to each other by a jig or the like in order to prevent displacement between them.

EXAMPLES

The effects of the present invention were evaluated by conducting the following experiments. First, a sound-permeable film to be attached to an electronic component was prepared in the procedure described below.

Example 1

First, a double-sided adhesive sheet was prepared. A silicone adhesive layer of 25 μm was formed by applying a solution obtained by dissolving a silicone adhesive in an organic solvent (toluene) to one of the surfaces of a polyimide base (Kapton (registered trademark of DuPont Corporation), manufactured by Toray Industries, Inc.: thickness 25 μm, heat shrinkage ratio 0.2% at 200° C. for 10 minutes) and heating the base at 130° C. for 5 minutes. A separator temporarily was attached to the silicone adhesive layer. Next, another separator was prepared, another silicone adhesive layer of 25 μm was formed by applying a silicone adhesive to one of the surfaces of the separator and heating the separator at 130° C. for 5 minutes, and then the separator was laid on the other surface of the polyimide base. Using the double-sided adhesive sheet obtained as described above and a PTFE porous membrane (NTF1133, manufactured by Nitto Denko Corporation: thickness 85 μm, pore diameter 3.0 μm), a sound-permeable film having a shape as illustrated in FIG. 1 (outside diameter φ5 mm×inside diameter φ3 mm) was produced.

Example 2

A sound-permeable film was produced in the same manner as in Example 1 except that an aramid film (Mictron (registered trademark of Toray Industries, Inc), manufactured by Toray Industries, Inc.: thickness 12 μm, heat shrinkage ratio 0% at 200° C. for 10 minutes), instead of a polyimide film, was used as a base of an double-sided adhesive sheet.

Example 3

A sound-permeable film was produced in the same manner as in Example 1 except that an acrylic adhesive, instead of a silicone adhesive, was used as an adhesive layer of a double-sided adhesive sheet.

Example 4

A sound-permeable film was produced in the same manner as in Example 1 except that a baseless acrylic double-sided adhesive sheet (No. 5915, manufactured by Nitto Denko Corporation: thickness 50 μm) was used as a double-sided adhesive sheet.

Example 5

A complex body consisting of a PTFE porous membrane and a support was produced by bonding a PTFE porous membrane (NTF1133, manufactured by Nitto Denko Corporation: thickness 80 μM, pore diameter 3.0 μm) and a polyarylate resin (Vecrus (registered trademark of Kuraray Co., Ltd.) MBBK-KJ, manufactured by Kuraray Co., Ltd.: thickness 30 μm, melting point 350° C. or higher) as a support. Meanwhile, a double-sided adhesive sheet was produced in the following manner. A silicone adhesive layer of 25 μm was formed by applying a solution obtained by dissolving a silicone adhesive in an organic solvent (toluene) to one of the surfaces of a polyimide base (Kapton (registered trademark of DuPont Corporation), manufactured by Toray Industries, Inc.: thickness 25 μm, heat shrinkage ratio 0.2% at 200° C. for 10 minutes) and heating the base at 130° C. for 5 minutes. A separator was temporarily attached to the silicone adhesive layer. Next, another separator was prepared, another silicone adhesive layer of 25 μm was formed by applying a silicone adhesive to one of the surfaces of the separator and heating the separator at 130° C. for 5 minutes, and then the separator was laid on the other surface of the polyimide base. Using the double-sided adhesive sheet obtained as described above and the above-mentioned complex body, a sound-permeable film having a shape as illustrated in FIG. 2 (outside diameter φ5 mm×inside diameter φ3 mm) was produced.

Example 6

A sound-permeable film was produced in the same manner as in Example 5 except that an aramid paper (Nomex (registered trademark of DuPont Corporation), manufactured by DuPont Teijin Advanced Papers, Ltd.: thickness 50 μm, not melted but gradually degraded at 300° C. or higher) was used as a support.

Comparative Example 1

A sound-permeable film was produced in the same manner as in Example 1 except that a polyethylene terephthalate film (Lumirror (registered trademark of Toray Industries, Inc.), manufactured by Toray Industries, Inc.: thickness 25 μm, heat shrinkage ratio 4% at 200° C. for 10 minutes), instead of a polyimide film, was used as a base of a double-sided adhesive sheet.

Comparative Example 2

A sound-permeable film was produced in the same manner as in Example 5 except that a PTFE porous membrane (NTF1033-K02, manufactured by Nitto Denko Corporation: thickness 30 μM, pore diameter 3.0 μm) and a support (polyolefin-based nonwoven fabric: thickness 120 μm) was used.
(Test Method)

A heating test was performed on the produced sound permeable film on the assumption that a reflow soldering process was to be performed later. Specifically, respective soundpermeable films were attached on SUS plates having a thickness of 50 μm and put into an isothermal heater (hot-air-type) of 280° C. for 3 minutes. Subsequently, the conditions of the sound-permeable films were observed visually. Table 1 shows the results thereof.

TABLE 1

|  | Visual Appearance | Evaluation |
|---|---|---|
| Example 1 | No peeling was observed | ◯ |
| Example 2 | No peeling was observed | ◯ |
| Example 3 | No peeling was observed | ◯ |
| Example 4 | No peeling was observed | ◯ |
| Example 5 | No peeling was observed | ◯ |
| Example 6 | No peeling was observed | ◯ |
| Comparative Example 1 | The sound-permeable film was peeled off from the SUS plate due to shrinkage of the base of the double-sided adhesive sheet | X |
| Comparative Example 2 | The complex body of the PTFE porous membrane and the support was peeled off from the double-sided adhesive sheet due to shrinkage of the support | X |

In the sound-permeable films in Examples 1 to 6, no change in the attached films was observed (the films were not peeled off) over a period before and after the heating test, and it was confirmed that the films have sufficient heat resistance. In contrast, the sound-permeable films in Comparative Examples 1 and 2 were peeled off as described in Table 1, which proved that these films have insufficient heat resistance.

The invention claimed is:

1. A sound-permeable film comprising:
a porous membrane that contains polytetrafluoroethylene as its main component, allows sound to pass therethrough, and prevents a water drop from passing therethrough; and
a heat-resistant double-sided adhesive sheet that is disposed on a part of at least one of main surfaces of the porous membrane in order to fix the porous membrane to another component,
wherein the heat-resistant double-sided adhesive sheet is a resin sheet including a base layer and two adhesive layers that sandwich the base layer therebetween, and
the base layer has a heat shrinkage ratio of less than 4% after being left for 10 minutes at 200° C.

2. The sound-permeable film according to claim 1, wherein the base layer contains a polyimide resin or an aramid resin as its main component.

3. A sound-permeable film comprising:
a porous membrane that contains polytetrafluoroethylene as its main component, allows sound to pass therethrough, and prevents a water drop from passing therethrough;
a heat-resistant double-sided adhesive sheet that is disposed on a part of a first main surface of the porous membrane in order to fix the porous membrane to another component; and
a heat-resistant and sound-permeable support that is disposed on a second main surface of the porous membrane,
wherein the heat-resistant double-sided adhesive sheet is a resin sheet including a base layer and two adhesive layers that sandwich the base layer therebetween, and
the base layer has a heat shrinkage ratio of less than 4% after being left for 10 minutes at 200° C.

4. The sound-permeable film according to claim 3, wherein the base layer contains a polyimide resin or an aramid resin as its main component.

5. An electronic component with a sound-permeable film, comprising:
an electronic component including a sound receiving portion that converts sound into an electrical signal or a sound emitting portion that converts an electrical signal into sound; and
a sound-permeable film that is attached to the electronic component, allows sound to be transmitted from outside to the sound receiving portion or sound emitted from the sound emitting portion to be transmitted outside, and prevents water drop from reaching the sound receiving portion or the sound emitting portion from outside,
wherein the electronic component is a component that is mounted on a circuit board to be operated,
the sound-permeable film includes: a porous membrane that contains polytetrafluoroethylene as its main component; and a heat-resistant double-sided adhesive sheet that is located between the porous membrane and the electronic component so as to fix the porous membrane and the electronic component to each other,
the heat-resistant double-sided adhesive sheet is a resin sheet including a base layer and two adhesive layers that sandwich the base layer therebetween, and
the base layer has a heat shrinkage ratio of less than 4% after being left for 10 minutes at 200° C.

6. A method of producing a circuit board on which an electronic component including a sound receiving portion that converts sound into an electrical signal or a sound emitting portion that converts an electrical signal into sound is mounted, the method comprising:
a first step of fixing or temporarily fixing a porous membrane that contains polytetrafluoroethylene as its main component to the electronic component using a heat-resistant double-sided adhesive sheet so that sound is allowed to be transmitted from outside to the sound receiving portion or sound emitted from the sound emitting portion is allowed to be transmitted outside and that a water drop is prevented from reaching the sound receiving portion or the sound emitting portion from outside; and
a second step of positioning the electronic component to which the porous membrane is fixed or temporarily fixed and the circuit board relatively to each other, and putting the positioned circuit board and electronic component into a reflow furnace so as to connect them by soldering,
wherein the first step and the second step are performed in this order, the heat-resistant double-sided adhesive sheet is a resin sheet including a base layer and two adhesive layers that sandwich the base layer therebetween, and
the base layer has a heat shrinkage ratio of less than 4% after being left for 10 minutes at 200° C.

7. The method of producing the circuit board on which the electronic component is mounted according to claim 6,
wherein the base layer is composed of a polyimide resin or an aramid resin, the adhesive layers are composed of an acrylic or silicone adhesive.

8. The method of producing the circuit board on which the electronic component is mounted according to claim 6,
wherein in the second step,
a solder having a lower melting point than a maximum adhesive temperature up to which the adhesive strength of the heat-resistant double-sided adhesive sheet can be maintained is selected as a solder for connecting the circuit board and the electronic component, and
the temperature in the reflow furnace is controlled within a range between the maximum adhesive temperature and the melting point of the solder.

* * * * *

UNITED STATES PATENT AND TRADEMARK OFFICE
CERTIFICATE OF CORRECTION

| | | |
|---|---|---|
| PATENT NO. | : 8,141,678 B2 | Page 1 of 1 |
| APPLICATION NO. | : 11/991977 | |
| DATED | : March 27, 2012 | |
| INVENTOR(S) | : Ikeyama et al. | |

It is certified that error appears in the above-identified patent and that said Letters Patent is hereby corrected as shown below:

Column 10, Line 31 (Claim 5): "prevents water drop" should read --prevents a water drop--.

Signed and Sealed this
Tenth Day of July, 2012

David J. Kappos
*Director of the United States Patent and Trademark Office*